United States Patent [19]
Drube et al.

[11] Patent Number: 5,954,101
[45] Date of Patent: Sep. 21, 1999

[54] MOBILE DELIVERY AND STORAGE SYSTEM FOR CRYOGENIC FLUIDS

[75] Inventors: Paul Arnold Drube, Apple Valley; Audrey Duane Preston, New Prague; Claus D. Emmer, Prior Lake; Jon Robert Turner; Thomas Karl Drube, both of Lakeville, all of Minn.

[73] Assignee: MVE, Inc., New Prague, Minn.

[21] Appl. No.: 08/982,166

[22] Filed: Dec. 1, 1997

Related U.S. Application Data

[63] Continuation-in-part of application No. 08/663,798, Jun. 14, 1996, Pat. No. 5,787,942.

[51] Int. Cl.[6] ........................................ F17C 17/02
[52] U.S. Cl. .................... 141/82; 141/18; 141/198; 141/231; 62/7; 62/50.1; 62/50.6; 62/53.2; 220/560.1
[58] Field of Search .................. 141/2–4, 11, 18, 141/21, 82, 231, 198; 62/7, 50.1, 50.2, 50.6, 53.2; 220/560.04, 560.1, 560.11

[56] References Cited

U.S. PATENT DOCUMENTS

| | | |
|---|---|---|
| 1,522,982 | 1/1925 | Strandt . |
| 3,929,155 | 12/1975 | Garretson . |
| 4,313,459 | 2/1982 | Mylander . |
| 4,444,230 | 4/1984 | Van Mullem . |
| 4,483,367 | 11/1984 | Ross, Jr. et al. . |
| 4,621,657 | 11/1986 | St. Ledger . |
| 4,625,753 | 12/1986 | Gustafson . |
| 4,909,038 | 3/1990 | Porter . |
| 4,956,975 | 9/1990 | Gustafson . |
| 5,235,999 | 8/1993 | Lindquist et al. . |
| 5,282,496 | 2/1994 | Kerger . |
| 5,360,139 | 11/1994 | Goode . |
| 5,404,918 | 4/1995 | Gustafson . |
| 5,411,374 | 5/1995 | Gram . |
| 5,549,142 | 8/1996 | Beale . |
| 5,682,750 | 11/1997 | Preston et al. . |

*Primary Examiner*—J. Casimer Jacyna
*Attorney, Agent, or Firm*—Rudnick & Wolfe

[57] ABSTRACT

A delivery and storage system for cryogenic fluids features a vehicle mounted dispensing system including a bulk storage tank that feeds cryogenic liquid to a sump containing a pump to pre-cool the pump. The pump feeds cryogenic liquid to another sump containing a meter so as to cool the meter. A valve selectively routes the cryogenic liquid from the meter sump to the bulk storage tank as the meter cools down. When the meter reaches operating temperature, cryogenic liquid is directed through the meter to a dispensing hose. The cryogenic liquid is dispensed into a liquid cylinder. The liquid cylinder features an automatic shut-off device to reduce the flow of the cryogenic liquid into the cylinder when the cylinder is full. The inner shell is held to the outer shell at the top by a combination stainless steel hose and composite cylinder neck. The bottom of the inner shell features a pair of pins which are supported by a strap across the bottom portion of the outer shell interior.

9 Claims, 5 Drawing Sheets

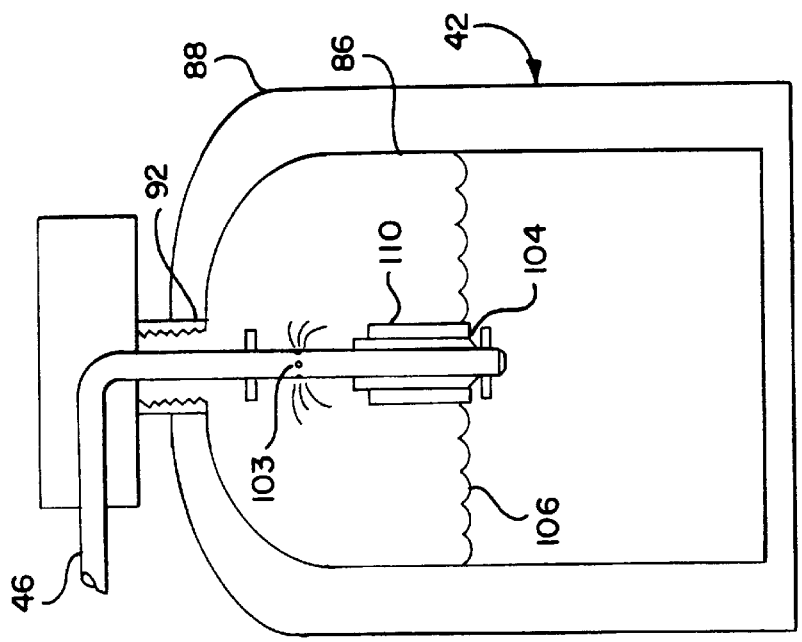
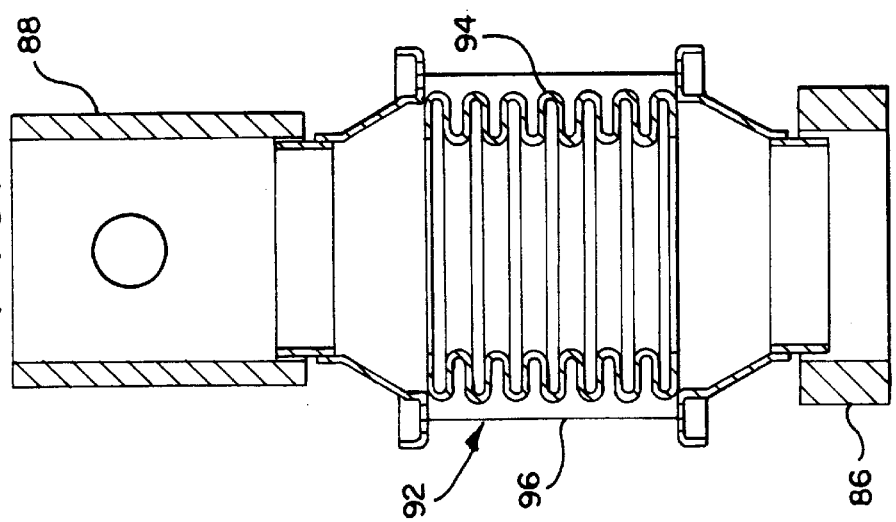
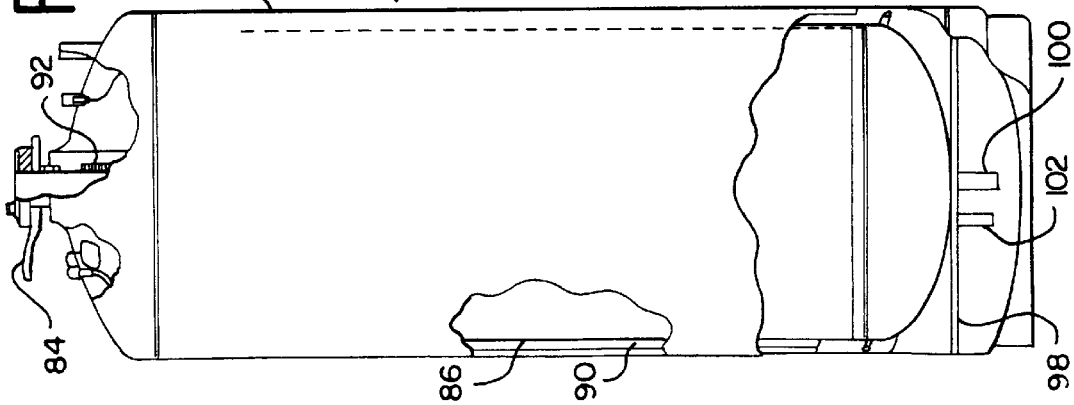

MOBILE DELIVERY AND STORAGE SYSTEM FOR CRYOGENIC FLUIDS

CROSS REFERENCE TO RELATED APPLICATION

This application is a continuation-in-part of U.S. application Ser. No. 08/663,798 filed Jun. 14, 1996, now U.S. Pat. No. 5,787,942.

BACKGROUND

The present invention generally relates to delivery and storage systems for cryogenic fluids and, more specifically, to a cryogenic liquid delivery system that allows for rapid dispensing of cryogenic liquid directly to a use point.

As is known, cryogenic liquids are typically stored in thermally insulated tanks which consist of an inner storage vessel mounted within, and thermally isolated from, an outer shell. Cryogenic liquid is usually dispensed from a bulk supply tank to smaller storage cylinders for use in various applications. Typically, the bulk supply tank is stationary and the storage cylinders are transported to the bulk supply, refilled and transported back to the use site. During the refilling operation, flow of liquid cryogen into the storage cylinder must be terminated at the appropriate time to prevent overfilling, which may result in venting and waste of croygen. Typically, the storage cylinders are weighed as they are being filled and flow of liquid cryogen is terminated when the appropriate cylinder weight is attained.

The structural reinforcements required to ensure durability of transportable storage cylinders provide additional heat conduction paths and increase the heat inleak to the stored cryogen. In addition, transporting the tanks can be costly. There have thus been recent efforts to utilize stationary storage cylinders, which provide more insulation against heat inleak. These stationary cylinders are refilled from a transportable bulk supply tank, which may be mounted on a truck, trailer or other type of vehicle.

A variety of mobile delivery systems currently exist for providing cryogenic liquids to storage cylinders at the use point. One type of delivery system, an example of which is the HLD series manufactured by MVE, Inc. of New Prague, Minn., includes a mobile high pressure storage tank combined with a pressure-building system. Upon arrival at the use point, the pressure in the storage tank must be increased so that the fluid therein will flow to a receiving tank. This "transfer pressure" is achieved by feeding liquid from the storage tank to a pressure-building heat exchanger where it is vaporized. The vapor thus produced is routed back to the gas space above the cryogenic liquid in the storage tank so that the storage tank pressure is increased. When the storage tank has reached transfer pressure, the storage tank delivery valve and the receiving tank fill valve are opened, and the receiving tank is filled.

Upon completion of the fill, the delivery system is disconnected from the receiving tank. The delivery system storage tank must then be vented to atmosphere prior to movement to prevent the condensation of the added warmer vapor into the liquid cryogen. This condensation is caused by the motion of the liquid cryogen in the tank during transport and is undesirable as it raises the temperature of the liquid cryogen. Venting may also be necessary to reduce the tank pressure to transport levels required by Department of Transportation regulations. Venting is undesirable, however, as it takes additional time, decreases the amount of product available for distribution and is potentially hazardous. Furthermore, the venting causes a loss of cryogenic vapor which results in increased waste.

Another type of cryogenic delivery system, an example of which is the HL series available from MVE, Inc. of New Prague, Minn., utilizes a mobile storage tank combined with a pump. When cryogenic liquid flows through the pump or meter of such a system that has not been cooled down to the temperature of the cryogen, the cryogenic liquid will boil due to the heat of the pump or meter and a two-phase flow, that is, a flow that is a mixture of liquid and gas, will result. This makes pumping extremely inefficient and accurate metering for small amounts of cryogen very difficult. As such, the pump, and meter when only a small amount of cryogen is to be distributed, of such systems must be cooled down to the temperature of the cryogen before the dispensing can begin. The pumps and meters for existing systems may require as long as 30 minutes to cool down. These long cool down times result in decreased efficiency in terms of utilization of human and equipment resource time. A system that utilizes a pre-cooled pump and meter submersed in a cryogen-filled sump has been disclosed as the subject of a commonly assigned U.S. patent application (Ser. No. 08/624,268). Such an arrangement does not exist for a mobile system designed for use point distribution.

Accordingly, an object of the invention is to provide a mobile liquid cryogen delivery system for use point distribution that minimizes the pump and meter cool down period required prior to dispensing.

Another object of the invention is to provide a mobile cryogenic delivery system that minimizes the necessity of venting.

Still another object of the invention is to provide a cryogenic delivery system that features liquid cylinders with higher insulating capability, lighter weight and lower cost.

SUMMARY

The present invention is directed to a system for delivering and storing cryogenic liquid to a use point. The system features a mobile dispensing system and a specially designed liquid cylinder that remains on site at the use point.

The mobile dispensing system is mounted on a vehicle and includes a bulk storage tank containing the cryogenic liquid. A sump containing a pump is connected by a supply line to the bulk storage tank so that the cryogenic liquid flows to the sump. As a result, the pump is submersed in the cryogenic liquid and remains cooled by the cryogen. A meter sump is connected by a supply duct to the pump so that the cryogenic liquid may be pumped to the meter sump to cool the meter disposed therein prior to dispensing the cryogen.

Upon exiting the meter sump, the cryogenic liquid encounters a valve by which it may be directed back to the bulk storage tank for recirculation. Since the meter will not operate accurately in measuring small amounts of cryogen until it is cooled to the temperature of the liquid cryogen, the valve is set initially to route the liquid cryogen back to the bulk storage tank. The temperature of the cryogen passing through the meter sump is measured by a resistance temperature device. When the temperature of this cryogen indicates that the meter has cooled down, the resistance temperature device sends an signal to a controller. The controller in turn indicates to the operator that the meter is ready. The operator then pushes a button on the controller so that the system valves are configured to route liquid cryogen through the meter to a dispensing hose.

If the pressure in the bulk storage tank becomes too low, gas may form in the cryogenic liquid as it flows to the pump. This results in a severe decrease in pump efficiency. To address this problem, cryogenic liquid flowing from the meter sump may be diverted to a heat exchanger where vapor is produced. This vapor is routed to the bulk storage tank so as to adequately pressurize it.

The cryogenic liquid flows out of the dispensing hose and into a specially designed liquid cylinder. The cylinder is designed for maximum insulation and to remain at the use point for repeated fillings. It features an outer shell and an inner shell with an evacuated air space in between as a source of insulation. The outer shell and inner shell are joined on top by a neck consisting of a stainless steel inner hose surrounded by a composite cylinder. The bottom portion of the outer shell features a strap across its interior while the inner shell has a pair of pins attached to its bottom. The pins engage holes in the strap so that the inner shell is supported within the outer shell. During the fill operation, a fill line is connected to the dispensing hose of the mobile dispensing system. This fill line passes through the neck and into the interior of the liquid cylinder. The system may include a means for automatically stopping the flow of cryogen into the liquid cylinder when a predetermined quantity of the cryogenic liquid has entered it.

For a more complete understanding of the nature and scope of the invention, reference may now be had to the following detailed description of embodiments thereof taken in conjunction with the appended claims and accompanying drawings.

BRIEF DESCRIPTION OF THE DRAWINGS

FIG. 5 is an enlarged, partially broken-away side elevation view of the liquid cylinder of the cryogenic delivery and storage system of FIG. 1B;

FIG. 6 is an enlarged vertical sectional view of the neck of the liquid cylinder of FIG. 5;

FIG. 7 is a vertical sectional view of the liquid cylinder of FIG. 5 showing a side elevation view of the automatic shut-off device contained therein.

DESCRIPTION

Figure 1A:
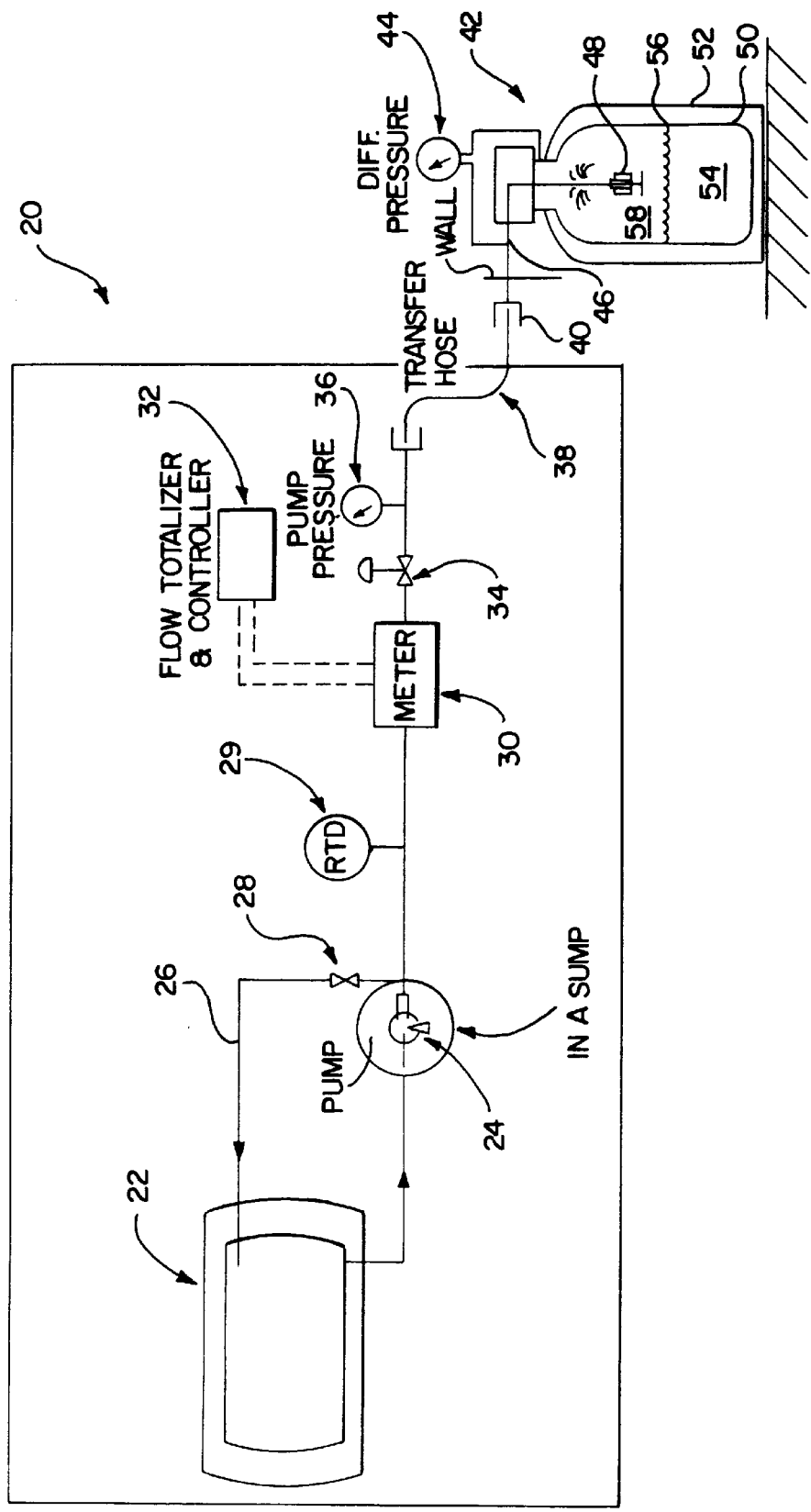
FIG. 1A is a schematic diagram of a cryogenic delivery and storage system suitable for use with the present invention.

Referring to FIG. 1A, there is illustrated a mobile delivery and storage system for cryogenic fluids suitable for use with the present invention. The bulk storage and dispensing system, generally designated 20, may be mounted on a transport truck or trailer. It includes bulk storage tank 22, which supplies cryogenic liquid to a sump containing a pump 24. While pump 24 is maintained in a pre-cooled state by the cryogen in the sump, a recirculation conduit 26 and valve 28 are provided to permit cool down of pump 24 and pressure control within bulk storage tank 22, if required. A temperature device 29 monitors the temperature of the dispensed liquid, for example, to determine the liquid density. Meter 30 is provided at the pump outlet and communicates with a flow totalizer and controller 32 for monitoring and controlling the amount of liquid dispensed. Dispensing valve 34 is disposed downstream of pump 24 and meter 30. A pressure gauge 36 is provided at the outlet of valve 34. A transfer hose 38 is coupled to the storage and dispensing system 20 and is provided with a quick-connect fitting 40 at its distal end for connecting to a storage cylinder 42.

A differential pressure gauge 44 is provided for sensing the difference between the pressure in cylinder 42 and inlet conduit 46, which conveys liquid cryogen to the interior thereof. A float 48 is disposed on inlet conduit 46 at a distal end within storage cylinder 42. Storage cylinder 42 includes an inner vessel 50 and an outer shell 52. Liquid cryogen 54 is contained in inner vessel 50 and defines liquid level 56. A vapor space 58 exists above the liquid 54. Inlet conduit 46 is provided with a number of spray ports 103 (FIG. 7) for dispersing the liquid cryogen about the vapor space above the stored liquid. This has the effect of cooling the vapor space to reduce pressure, thereby permitting the flow of liquid into the tank.

While this system, which is disclosed in the parent application, U.S. application Ser. No. 08/663,798, features only a pump in the sump, it is desirable, if small quantities of cryogen are to be dispensed, that the meter also be disposed in a sump. This may be accomplished in the manner shown in FIGS. 1B and 4. These systems are discussed below.

Figure 1B:
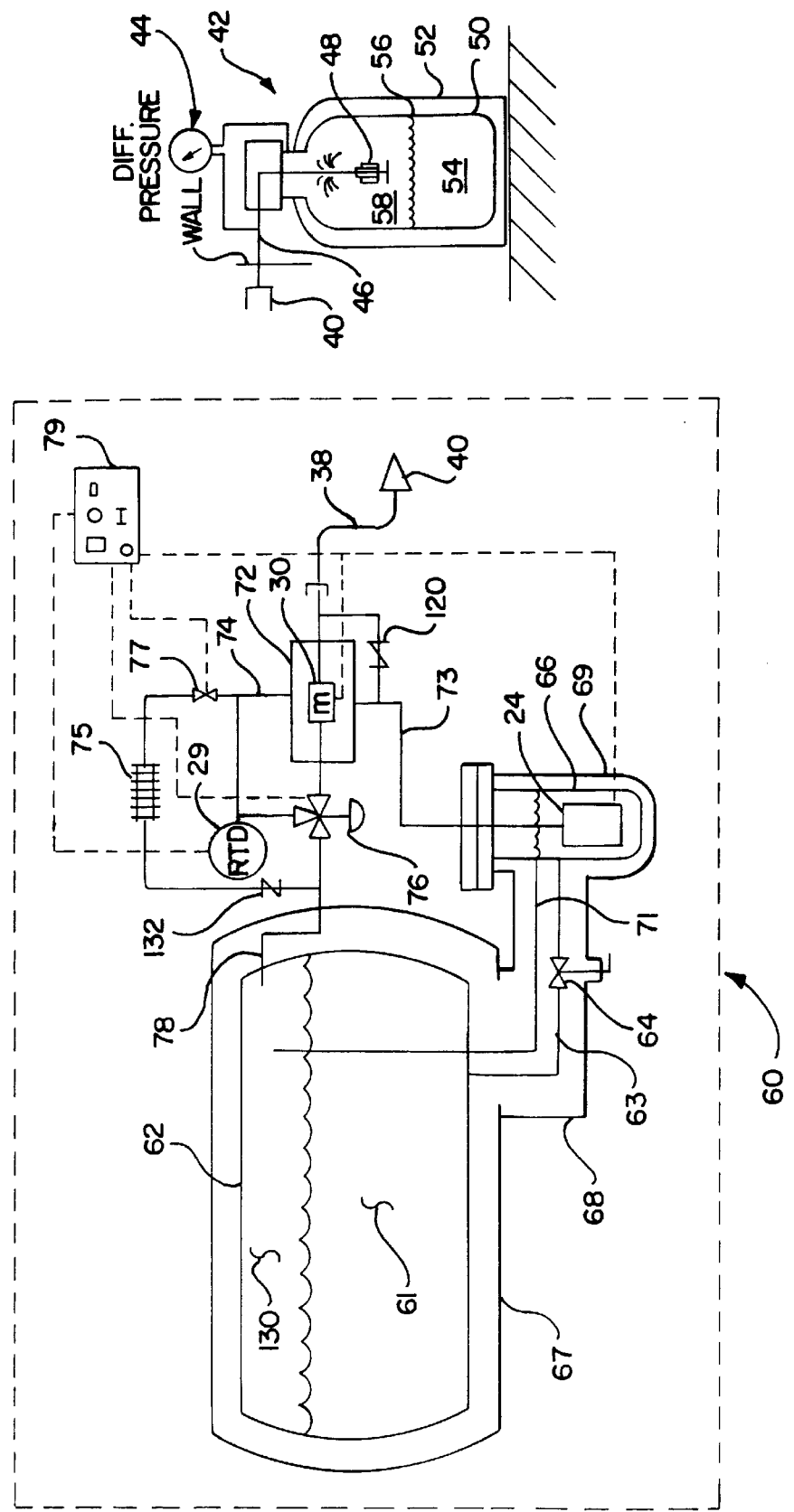
FIG. 1B is a schematic diagram of an embodiment of the cryogenic delivery and storage system of the present invention.

Referring to FIG. 1B, an embodiment of the mobile delivery and storage system for cryogenic fluids of the present invention is shown. The bulk storage and dispensing system is indicated generally at 60. Like the bulk storage and dispensing system 20 of FIG. 1A, system 60 may be mounted on a truck, trailer or other type of vehicle and is used to fill storage cylinder 42 at the use point.

Liquid cryogen 61 is stored in bulk storage tank 62. Pump supply line 63 feeds liquid cryogen 61 by gravity through feed isolation valve 64 to a sump 66. Bulk storage tank 62, pump supply line 63 and sump 66 are surrounded by bulk tank jacket 67, sump feed jacket 68 and sump jacket 69, respectively. The interior of jackets 67, 68 and 69 are in fluid communication with one another and are evacuated to a high vacuum to insulate bulk storage tank 62, pump supply line 63 and sump 66 from ambient temperatures.

Sump 66 also features vent return line 71 which passes through sump feed jacket 68 to bulk storage tank 62. Sump 66 is filled with cryogen from bulk storage tank 62 to approximately the height of vent return line 71. Pump 24 is submersed within the liquid and is thus maintained at cryogenic temperatures so that it is ready to pump liquid cryogens immediately without the occurrence of two-phase flow. As a result, pump cool down is not required before liquid cryogen is dispensed. Feed isolation valve 64 allows the supply of cryogen to sump 66 to be cut off so that it can be drained, and pump 24 accessed, in the event that it requires maintenance, repair or replacement.

Pump 24 is connected to a meter sump 72 by meter supply duct 73. Meter sump 72 contains meter 30. Liquid entering meter sump 72 via meter supply duct 73 does not enter meter 30 but rather passes around it and exits meter sump 72 through line 74. Liquid flowing through line 74 may flow to either heat exchanger 75 or to recirculation control valve 76, depending on the setting of force feed valve 77. Positioned adjacent recirculation control valve 76 is resistance temperature device (RTD) 29. From recirculation control valve 76 the liquid may be directed either into bulk storage tank 62 through line 78 or through meter 30 to dispensing hose 38.

An electronic sequencer or microcomputer type controller 79, as will be described below, allows push-button delivery of cryogen, without manipulation of the valves by the operator. This allows for reduced operator training time and fast deliveries. Controller 79 may also provide invoice printouts and data transfer capability.

Figure 2:
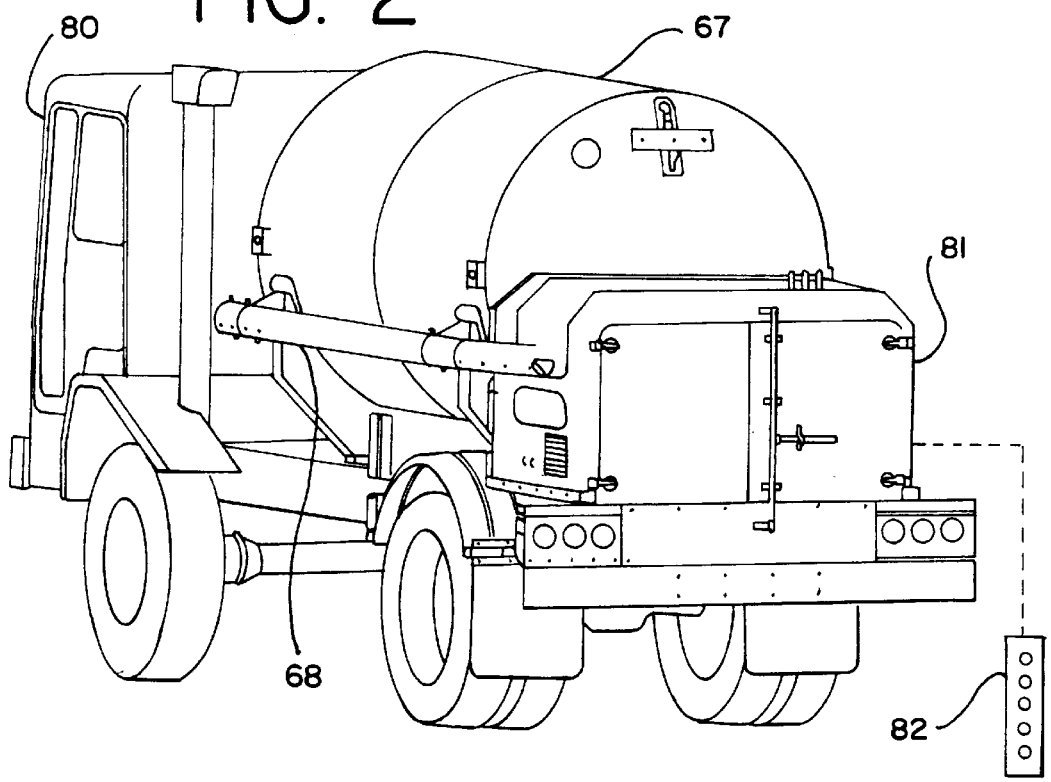
FIG. 2 is a perspective view of the mobile portion of the cryogenic delivery and storage system of FIG. 1B mounted on a truck.

FIG. 2 shows the bulk storage and dispensing system 60 of FIG. 1B mounted on the back of a truck 80. As described above, bulk tank jacket 67 surrounds the bulk storage tank while sump feed jacket 68 contains pump supply line 63 and vent return line 71 (FIG. 1B). Sump feed jacket 68 leads from bulk tank jacket 67 to a cabinet 81. Cabinet 81 is positioned at the rear end of truck 80 for easy access by an operator and contains the remaining items of system 60 of FIG. 1B. Controller 79 may optionally feature a remote control operation panel 82 that allows the operator to fill a number of liquid cylinders without having to return to the truck 80.

Figure 3:
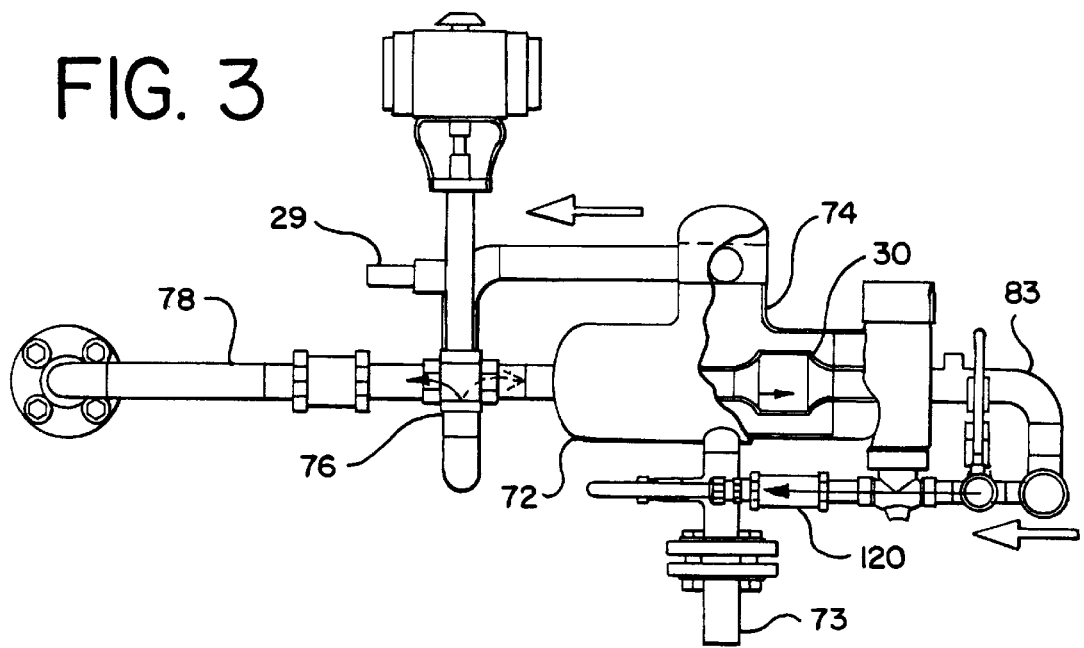
FIG. 3 is an enlarged, partially broken-away side elevation view of the meter sump of the cryogenic delivery and storage system of FIG. 1B.

The details of the meter sump 72 and the piping associated with RTD 29 of FIG. 1B are shown in FIG. 3. Meter supply duct 73 is connected to the bottom of meter sump 72, while line 74 is connected to its top. While meter 30 is disposed within meter sump 72, there is not a passageway through which fluid may pass directly from the interior of meter sump 72 to the interior of meter 30. Line 74 leads to recirculation control valve 76 which allows it to selectively communicate with either line 78 or meter 30. In situations where the latter is selected, liquid from line 74 flows through meter 30 and line 83 and then into dispensing hose 38 (FIG. 1B).

While the system travels between dispensing locations, meter sump 72 does not contain liquid cryogen, thus, meter 30 must be cooled down prior to the dispensing of cryogen in order to prevent two-phase flow and to permit accurate metering. While pump 24 does not require a cool down period, it still must ramp up to the required pumping speed upon being started. In particular, pump 24 would suffer wear or possible damage if it were started and instantly run at full speed. As pump 24 is ramping up, cryogen is pumped through meter supply duct 73 to meter sump 72, where it passes around meter 30 to cool it to cryogenic temperatures. During this meter cool down period, force feed valve 77 (FIG. 1B) and recirculation control valve 76 are set by controller 79 so that the cryogen exiting meter sump 72 passes into the bulk storage tank through line 78. As a result, this liquid cryogen is not metered. This prevents the customer from being inappropriately charged for recirculating cryogen during the meter cool down period.

When meter 30 reaches cryogenic temperature, RTD 29 sends a signal to controller 79 which displays the appropriate indication to the operator. The operator then removes dispensing hose 38 from cabinet 81 (FIG. 2) and connects it to the use point liquid cylinder 42 (FIG. 1B) via quick connect hose couplings 40. The operator next switches recirculation control valve 76 so that the cryogen is routed through meter 30, through dispensing hose 38 and into liquid cylinder 42. Pump 24 is selected so as to deliver at high discharge pressures to overcome pressure drops in the event that the combined dispensing hose and fill line is of a very long length. A suitable pump is the ACD Submerged Centrifugal Pump which is available from ACD, Inc. of Santa Anna, Calif.

Figure 4:
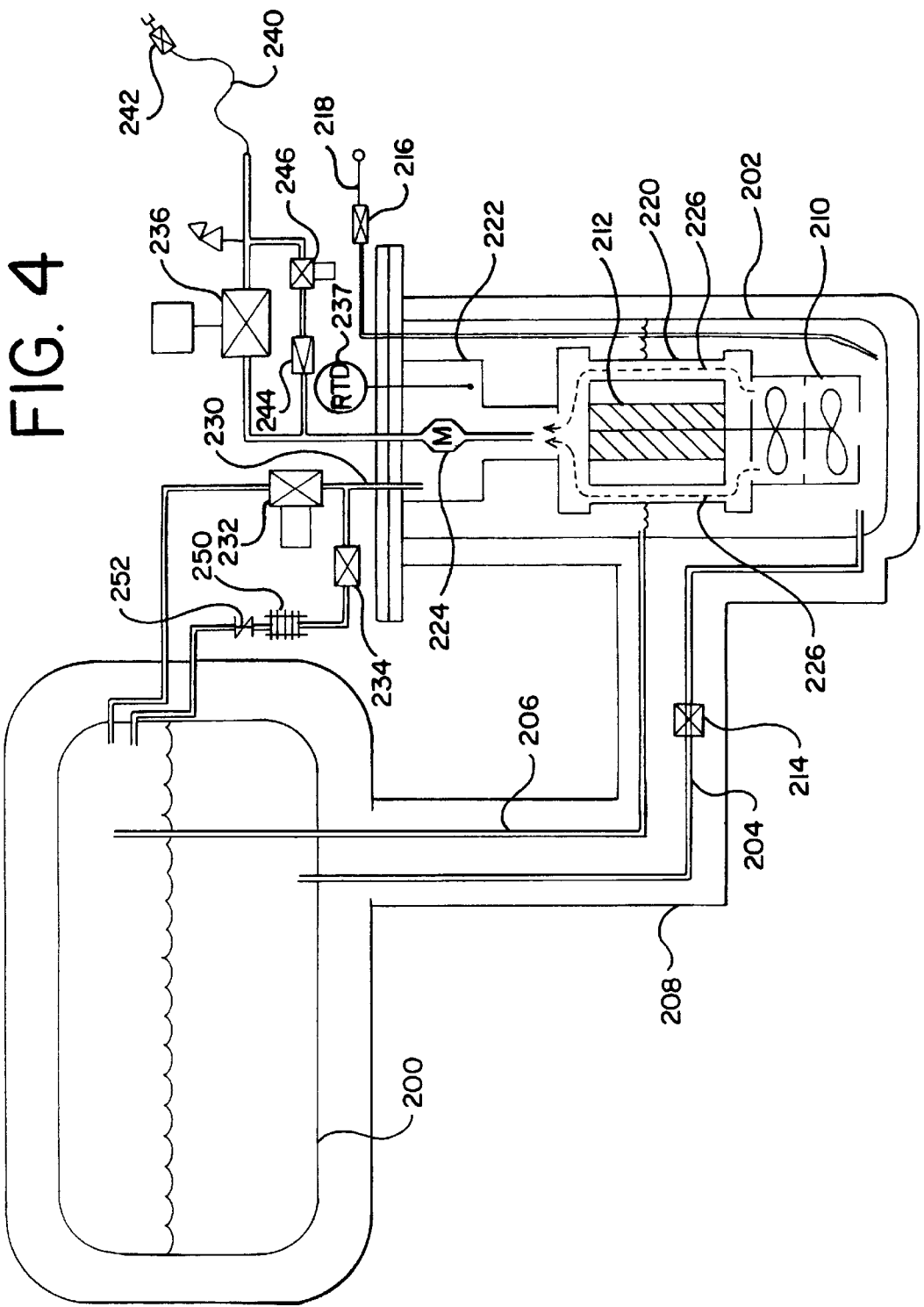
FIG. 4 is a schematic diagram of an alternative embodiment of the cryogenic delivery and storage system of the present invention.

Turning now to FIG. 4, an alternative embodiment of the bulk storage and dispensing system is shown. Like the bulk storage and dispensing systems of FIGS. 1A and 1B (indicated at 20 and 60 respectively), the system of FIG. 4 may be mounted on a truck, trailer or other type of vehicle and is used to fill storage cylinder 42 at the use point. In addition, the system of FIG. 4 may be controlled by a device such as controller 79 in FIG. 1B.

Liquid cryogen is stored in bulk storage tank 200, which is in communication with sump 202 via pump supply line 204 and vent return line 206. As a result, the liquid flows to sump 202 due to gravity so as to fill it to the level of vent return line 206. Bulk storage tank 202, pump supply line 204, vent return line 206 and sump 202 are surrounded by vacuum jacket 208. The jacket is evacuated to a high vacuum to insulate the components therein from ambient temperatures.

Disposed within sump 202 is a two-stage pump 210 which is powered by motor 212. Pump 210 is positioned so that it is always submerged within the liquid cryogen contained in sump 202. As a result, pump cool down is not required before liquid cryogen is dispensed. Pump 210 may be accessed for repair or the like by draining the cryogenic liquid from sump 202. This may be accomplished by closing feed isolation valve 214 and opening sump drain valve 216. Opening sump drain valve 216 allows the cryogenic liquid to be withdrawn from sump 202 through line 218, which is connected to a source of suction (not shown).

Surrounding pump motor 212 is a meter supply duct 220. The upper end of meter supply duct 220 is connected to a meter sump 222 which contains meter 224. During transport, meter sump 222 remains free of liquid cryogen. Upon activation of pump 210, however, liquid cryogen is pumped up to meter sump 222 through meter supply duct 220 as illustrated by arrows 226. This allows meter 224 to be cooled as pump 210 is ramping up to the required pumping speed.

Liquid cryogen entering meter sump 222 may exit either through meter 224 or line 230. The path that the exiting liquid takes is determined by the settings of recirculation control valve 232, force feed valve 234 and dispensing control valve 236. As pump 210 is ramping up, recirculation control valve 232 is open and force feed valve 234 and dispensing control valve 236 are closed. This allows cryogenic liquid to circulate past meter 224 and back to bulk tank 200 so as to cool the meter without charging the customer for doing so.

When meter 224 has been cooled to the proper temperature, as indicated by RTD 237, and pump 210 has ramped up to operating speed, the system is ready to dispense. At this time, recirculation control valve 232 is closed and dispensing control valve 236 is opened (force feed valve 234 remains closed). Cryogenic liquid is then dispensed out through dispensing hose 238, which is connected to liquid cylinder 42 (FIG. 1B) via quick connect hose coupling 242.

The details of liquid cylinder 42 are illustrated in FIG. 5. Liquid cylinder 42 features an inner shell 86 disposed within outer shell 88. Evacuated space 90 contains a vacuum and thus insulates inner shell 86 and its contents from the warmer outer shell 88 and its surrounding environment.

Liquid cylinder 42 is designed to be located at the use point. It is not designed to be transported to the use point in a filled condition. As such, liquid cylinder 42 does not require the hefty internal bracing that is required for cylinders that are regularly transported liquid full. This allows liquid cylinder 42 to be manufactured with greater insulating capability. The higher insulating efficiency of liquid cylinder 42 allows it to maintain cryogens in a cooler state longer.

Inner shell 86 of liquid cylinder 42 is supported within outer shell 88 at the top via neck 92. FIG. 6 shows the details of neck 92. Neck 92 is designed to be high strength yet light weight and resistant to heat transfer and consists of a stainless steel hose portion 94 surrounded by a composite cylinder 96. The wavy wall construction of hose 94 increases its effective length for heat conduction purposes so that the heat transfer along it between inner shell 86 and outer shell 88 is minimized. Composite cylinder 96 may be constructed out of any composite that provides high strength combined with low thermal conductivity and light weight. An example of a suitable composite is KEVLAR®, manufactured by DuPont.

Referring back to FIG. 5, the bottom portion of liquid cylinder 42 features a strap 98 that is welded by its ends to opposing interior surfaces of outer shell 88. Strap 98 is preferably made of stainless steel that is wrapped with fiberglass and features a pair of holes therethrough. Inner shell 86 features pins 100 and 102 which protrude down from its bottom. Pins 100 and 102 fit into the holes in strap 98 so as to restrain inner shell 86 from lateral and rotational movement while strap 98 supports inner shell 86 from the bottom. This configuration minimizes heat transfer between outer shell 88 and inner shell 86 while providing proper support for inner shell 86.

As shown in FIG. 7, a low restriction fill line 46 leads through neck 92, into inner shell 86 and to a top fill spray header 103. The flow of cryogen through spray header 103 is controlled by automatic shut-off device 104, which is the subject of copending and commonly assigned U.S. patent application Ser. No. 08/663,798 hereby incorporated by reference. As the cryogen flows into liquid container 42 through spray header 103, the liquid cryogen level 106 within inner shell 86 rises, lifting the float 110 of automatic shut-off device 104 with it. Cryogen continues to flow into the inner shell 86, and cryogen level 106 and float 110 continues to rise, until float 110 covers the holes of spray header 103 and the flow of cryogen into the liquid container 82 is severely reduced. Referring to FIG. 1B, this reduction in cryogen flow is sensed by meter 30 and a signal is relayed to controller 79 which then shuts off pump 24 and switches recirculation control valve 76 so that the remaining pumped cryogen flows into bulk storage tank 62 through line 78. The system of FIG. 4 may operate in a similar manner via meter 224, pump 210 and through manipulation of dispensing control valve 236 and recirculation control valve 232.

The combination of low restriction fill line 46 with the automatic control provided by controller 79 and the zero and minimal cool down times for the pump and meter, respectively, allow a standard sized liquid cylinder 42 to be filled in three minutes or less and, under normal conditions, with zero product loss.

Referring again to FIG. 1B, after liquid cylinder 42 is filled, and pump 24 is shut off, the operator disconnects dispensing hose 38 from liquid cylinder 42 by releasing quick connect hose couplings 40. The liquid remaining in dispensing hose 38 drains into sump 66 through check valve 120. Similarly, with regard to the system of FIG. 4, dispensing hose 240 drains into sump 202 through check valve 244 and hose drain control valve 246 when coupling 242 is disconnected from cylinder 42. Hose couplings 40 and 242 seal dispensing hoses 38 and 240 upon release from the liquid cylinder 42. This allows dispensing hoses 38 and 240 to be maintained at an elevated pressure which keeps them purged and free of moisture that would otherwise contaminate a receiving liquid cylinder or prevent couplings 40 and 242 from functioning properly.

The pump supply line 63 and isolation valve 64 of FIG. 1B are designed to minimize the pressure drop between bulk storage tank 62 and sump 66. This normally provides for sufficient pressure to feed pump 24. During extended deliveries, however, as the vapor space 130 above the liquid cryogen 61 in bulk storage tank 62 increases in volume, the pressure in vapor space 130 may drop to levels that can allow gas to be formed in the liquid being delivered to pump 24. This is undesirable since cryogenic pumps cannot efficiently pump such a two-phase cryogen. This problem can be remedied by switching force feed valve 77 so that a quantity of the liquid cryogen is fed through heat exchanger 75. Heat exchanger 75 vaporizes the liquid cryogen that flows through it and delivers the gas thus produced through check valve 132 and into vapor space 130 through line 78. This increases the pressure within bulk storage tank 62 so that two-phase flow to pump 24 does not occur.

The same result may be achieved with the system of FIG. 4 by opening force feed valve 234 when recirculation control valve 232 is closed. More specifically, by opening force feed valve 234, a portion of cryogenic liquid flows through heat exchanger 250 and is vaporized. This vapor is delivered into the vapor space of bulk tank 200 through check valve 252 so that the pressure therein is increased.

While a variety of alternative materials may be used, bulk storage tanks 62 and 200 and sumps 66, 222 and 226 are preferably constructed from stainless steel while bulk tank jacket 67, sump feed jacket 68, sump jacket 69 and vacuum jacket 208 are preferably constructed of carbon steel. For added reliability, all plumbing may be stainless steel while all valves may be bronze. Liquid cylinder 42 preferably is constructed of stainless steel.

While the preferred embodiments of the invention have been shown and described, it will be apparent to those skilled in the art that changes and modifications may be made therein without departing from the spirit of the invention, the scope of which is defined by the appended claims.

What is claimed is:

1. A system adapted to be mounted to a vehicle for storing and delivering cryogenic liquid to a use point comprising:
   a) a bulk storage tank containing a cryogenic liquid;
   b) a sump containing a pump disposed below the level of said storage tank;
   c) a pump supply line connected between said bulk storage tank and said sump so that the cryogenic liquid flows by gravity to said sump so that said pump is submersed in the cryogenic liquid;
   d) a meter sump having an inlet, an outlet and a meter disposed therein;
   e) a meter supply duct connected between said pump and the inlet of said meter sump so that the cryogenic liquid is pumped to the meter sump to cool the meter;
   f) a recirculation control valve in circuit between the outlet of said meter sump and said bulk storage tank so that the cryogenic liquid flowing through the meter sump may be directed to the bulk storage tank while the meter is cooling down and thereafter redirected through the meter; and
   g) a dispensing hose connected to said meter so that cryogenic liquid entering the meter flows through the dispensing hose to the use point.

2. The system of claim 1 further comprising a liquid cylinder located at the use point and having a fill line adapted to be removably connected to the dispensing hose so that the cryogenic liquid flows into said liquid cylinder.

3. The system of claim 2 further comprising a means for automatically stopping the flow of cryogenic liquid into the liquid cylinder when a predetermined quantity of cryogenic liquid has entered the liquid cylinder.

4. The system of claim 1 further comprising a force feed valve and a heat exchanger in circuit between said pump and said bulk storage tank so that the cryogenic liquid may be selectively routed by the force feed valve through the heat exchanger so as to pressurize said bulk storage tank.

5. The system of claim 1 further comprising a resistance temperature device in communication with said meter sump, said resistance temperature device indicating when the meter is at a predetermined temperature.

6. A system for delivering and storing cryogenic liquid at a use point comprising:
   a) a mobile dispensing system adapted for mounting to a vehicle, said mobile dispensing system including:
      i) a bulk storage tank containing a cryogenic liquid;
      ii) a sump containing cryogenic liquid due to fluid communication with said bulk storage tank;
      iii) a pump submersed in said sump and for pumping cryogenic liquid from said sump;
      iv) a dispensing hose;
      v) a meter in circuit between said pump and said dispensing hose so that the cryogenic fluid is pumped through said meter to said dispensing hose; and
   b) a liquid cylinder located at the use point and including:
      i) an outer shell having a top portion and a bottom portion;
      ii) an inner shell having a top portion and a bottom portion and defining an interior, said inner shell disposed within said outer shell so that a space is defined between the inner and outer shells, said space being evacuated to below atmospheric pressure;
      iii) a neck securing the top portion of the inner shell to the top portion of the outer shell; and
      iv) a fill line removably connected to the dispensing hose of the mobile dispensing system, said fill line passing through the neck and into the interior of the liquid cylinder so that a flow of cryogenic liquid into the interior may occur;
   wherein said neck includes:
      a) an inner hose having a wavy wall construction, said inner hose connected to the inner and outer shells; and
      b) a cylinder surrounding said inner hose and connected to the inner and outer shells.

7. The system of claim 6 further comprising a means for stopping the flow of cryogenic liquid into the interior of the liquid cylinder when a predetermined quantity of cryogenic liquid has entered the interior.

8. The system of claim 6 further comprising a force feed valve and a heat exchanger in circuit between said pump and said bulk storage tank so that the cryogenic liquid may be selectively routed by the force feed valve through the heat exchanger so as to pressurize said bulk storage tank.

9. The system of claim 6 further comprising:
   a) a strap disposed within the bottom portion of the outer shell of the liquid cylinder, said strap having a hole therethrough; and
   b) a pin disposed upon the bottom portion of the inner shell of the liquid cylinder, said pin engaging the hole of the strap.

* * * * *